United States Patent
Alldredge et al.

(10) Patent No.: US 9,664,492 B2
(45) Date of Patent: May 30, 2017

(54) METHODS AND APPARATUS FOR DEFINING A PROBE CONFIGURATION USING A PROBE CONFIGURATION TOOL

(71) Applicant: General Electric Company, Schenectady, NY (US)

(72) Inventors: Gregory Mark Alldredge, Gardnerville, NV (US); Daryl Ronald Frogget, Gardnerville, NV (US); Donald Evan Marshall, Reno, NV (US); Brian Dean Abbott, Gardnerville, NV (US); Jacqueline Marie Tappan, Minden, NV (US)

(73) Assignee: General Electric Company, Schenectady, NY (US)

(*) Notice: Subject to any disclaimer, the term of this patent is extended or adjusted under 35 U.S.C. 154(b) by 1189 days.

(21) Appl. No.: 13/728,368

(22) Filed: Dec. 27, 2012

(65) Prior Publication Data

US 2014/0188428 A1    Jul. 3, 2014

(51) Int. Cl.

| | |
|---|---|
| *G01C 9/00* | (2006.01) |
| *G01D 3/00* | (2006.01) |
| *G01P 21/00* | (2006.01) |
| *G06F 11/30* | (2006.01) |
| *G21C 17/00* | (2006.01) |
| *G01B 5/14* | (2006.01) |
| *G06F 3/0484* | (2013.01) |

(52) U.S. Cl.
CPC ............. *G01B 5/14* (2013.01); *G06F 3/0484* (2013.01); *G05B 2219/32235* (2013.01); *G05B 2219/35* (2013.01)

(58) Field of Classification Search
CPC .................. G01B 5/14; G06F 3/0484
USPC .................................... 702/108, 183
See application file for complete search history.

(56) References Cited

U.S. PATENT DOCUMENTS 5,963,884 A    10/1999    Billington et al.
6,192,325 B1    2/2001    Piety et al.
(Continued)

FOREIGN PATENT DOCUMENTS

EP    2345878 A2    7/2011
WO    0165322 A1    9/2001

OTHER PUBLICATIONS

Bently Nevada, Inc., "ANDRE SXP Dynamic Signal Processing Instrument." Copyright 2005-2012.
(Continued)

*Primary Examiner* — Michael Nghiem
(74) *Attorney, Agent, or Firm* — Fletcher Yoder, P.C.

(57) ABSTRACT

A method for defining a probe configuration using an interactive probe configuration tool is provided. The probe configuration tool comprises a shaft icon displayed on the probe configuration tool, and a probe position indicator configured to display an orientation of at least one first probe icon relative to the shaft icon. The probe position indicator is further configured to modify the orientation of the at least one first probe icon based on input from a user. The probe configuration tool further comprises a probe type indicator configured to display a type of the at least one first probe icon, wherein the probe position indicator and the probe type indicator are simultaneously displayed on a presentation interface.

17 Claims, 6 Drawing Sheets

(56) References Cited

U.S. PATENT DOCUMENTS

| | | | |
|---|---|---|---|
| 7,209,847 B2 * | 4/2007 | Kobayashi | G01R 35/007 |
| | | | 702/85 |
| 8,275,580 B2 | 9/2012 | Dausend et al. | |
| 8,301,412 B2 | 10/2012 | Green et al. | |
| 8,311,698 B2 | 11/2012 | Boss et al. | |
| D711,912 S * | 8/2014 | Alldredge | D14/489 |
| D717,811 S * | 11/2014 | Alldredge | D14/485 |
| 9,507,484 B2 * | 11/2016 | Alldredge | G06F 13/10 |
| 2003/0028269 A1 * | 2/2003 | Spriggs | G05B 15/02 |
| | | | 700/83 |
| 2010/0131227 A1 | 5/2010 | Richer et al. | |
| 2011/0178737 A1 * | 7/2011 | Hudson | G01H 1/003 |
| | | | 702/56 |
| 2013/0017507 A1 * | 1/2013 | Moffson | A61C 1/084 |
| | | | 433/27 |
| 2014/0148808 A1 * | 5/2014 | Inkpen | G01B 7/003 |
| | | | 606/80 |
| 2014/0189561 A1 * | 7/2014 | Alldredge | G06F 13/10 |
| | | | 715/771 |

OTHER PUBLICATIONS

PCT Search Report and Written Opinion issued Apr. 15, 2014 in connection with corresponding PCT Patent Application No. PCT/US2013/069990.

* cited by examiner

METHODS AND APPARATUS FOR DEFINING A PROBE CONFIGURATION USING A PROBE CONFIGURATION TOOL

BACKGROUND OF THE INVENTION

The embodiments described herein relate generally to a data analyzer for use in diagnosing and monitoring a machine, and, more particularly, to methods and apparatus for operating a probe configuration tool used to configure the data analyzer When operating machinery, it may be necessary or advantageous to monitor the operating conditions of the machine to confirm the machine is operating within pre-determined operating limitations. At least some known monitoring and diagnostic systems use transducers, or probes, to collect operational data from the machine during a diagnostic test that is compared to stored pre-determined operating limitations to determine if the machine is operating normally. Data collected during the diagnostic test is also typically stored and analyzed over time to provide additional information regarding the machine's operating condition. At least some known diagnostic systems require a user to define a configuration of the probes that are used to measure the machine operating conditions on a data analyzer to facilitate data collection. At least some probe configurations include information regarding the number of probes used in the machine, the orientation of each probe within the machine, and the operating condition each probe is monitoring.

However, known diagnostic systems may use complex computer software such that inexperienced users may define the configuration incorrectly. The complexity of known data analyzer computer software may also require the probe configuration to be defined in the computer software before performing the diagnostic test. However, such definitions may be time-consuming and may also be complex. Furthermore, at least some known methods of defining a probe configuration rely on detailed English-language descriptions of the machine, which may cause a non-English speaker to define the configuration inaccurately. Defining the configuration or probe inaccurately can result in obtaining unusable diagnostic data collection. As such, the use and accuracy of known diagnostic systems may be limited.

Accordingly, what is needed is an intuitive method and apparatus for defining a probe configuration that displays the information necessary to define the configuration and that facilitates simple configuration of probes in a relatively short period of time.

BRIEF DESCRIPTION OF THE INVENTION

In one aspect, a probe configuration tool is provided. The probe configuration tool comprises a shaft icon displayed on the probe configuration tool, and a probe position indicator configured to display an orientation of at least one first probe icon relative to the shaft icon. The probe position indicator is further configured to modify the orientation of the at least one first probe icon based on input from a user. The probe configuration tool further comprises a probe type indicator configured to display a type of the at least one first probe icon, wherein the probe position indicator and the probe type indicator are simultaneously displayed on a presentation interface.

In another aspect, a method of defining a probe configuration is provided. The method of defining a probe configuration comprises displaying to a user, on a presentation interface coupled to a processor, a shaft icon and an orientation of at least one first probe icon relative to the shaft icon. A user input interface coupled to the presentation interface and the processor is configured to modify the orientation of the at least one first probe icon based on input from the user. The method of defining a probe configuration further comprises displaying to the user a type of the at least one first probe icon, wherein the orientation and the type of the at least one first probe icon are simultaneously displayed on a presentation interface.

In yet another aspect, a processor is provided. The processor is configured to display a shaft icon representative of a shaft and a probe position indicator substantially indicative of an orientation of a probe positioned proximate to the shaft. The probe position indicator is configured to display an orientation of at least one first probe icon, representative of said probe, relative to the shaft icon, wherein the probe position indicator is further configured to modify the orientation of the at least one first probe icon based on input from a user. The processor is also configured to display a probe type indicator configured to display a type of the at least one first probe icon, wherein the probe position indicator and the probe type indicator are simultaneously displayed on a presentation interface.

DETAILED DESCRIPTION OF THE INVENTION

The apparatus and methods described herein enable a probe configuration to be defined using a probe configuration tool embedded within data analyzer software. The probe configuration tool, operating on a computing device, may display, in a single location, information such as the number of probes coupled to a bearing, the probe type, the orientation of at least one probe with respect to the machine to be diagnosed, and the sensitivity level of the probe. Further, the probe configuration tool facilitates modification by a user of the information displayed.

As used herein, the term "component" is an element of the data analyzer or the machine to be monitored in accordance with the diagnostic system. Motors, engines, gearboxes, pumps, fans, card types and like items are examples of components. As used herein, the term "configuration" is a detailed definition of the machine, the data analyzer, or the probes comprising one or more components and/or how they are arranged. As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Figure 1:
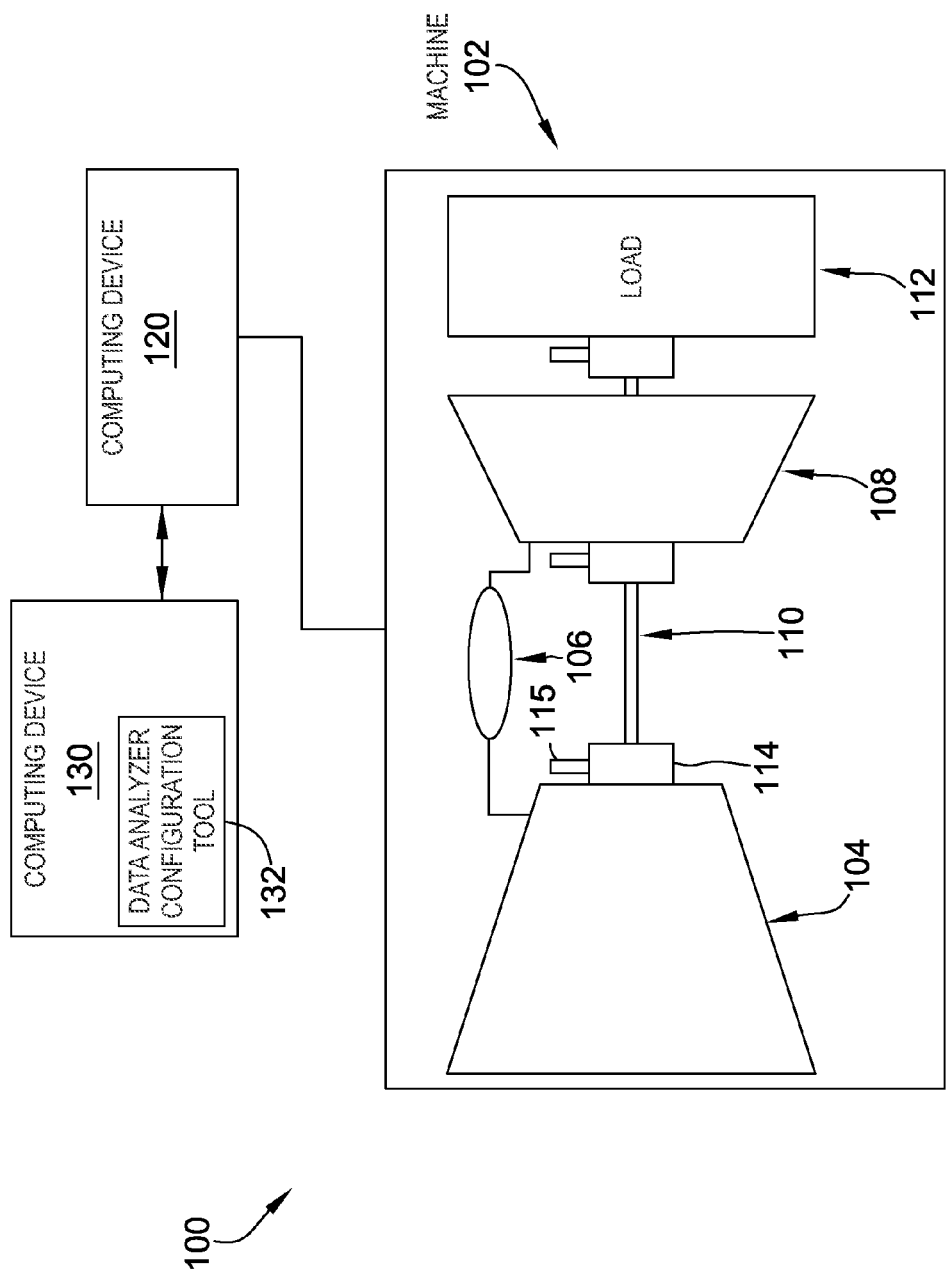
FIG. 1 is a schematic diagram of an exemplary diagnostic system.

FIG. 1 is a schematic diagram of an exemplary diagnostic system 100. In the exemplary embodiment, diagnostic system 100 includes a machine 102, such as a gas turbine engine, a data analyzer 120, and a computing device 130. In the exemplary embodiment, machine 102 includes, coupled in a serial flow arrangement, a compressor 104, a combustor assembly 106, and a turbine 108 that is rotatably coupled to compressor 104 via a rotor shaft 110. Turbine 108 may be coupled to, via shaft 110, a load 112, such as a generator for producing electricity. Machine 102 further includes a plurality of probes 115 coupled to bearings 114 that surround shaft 110. Alternatively, probes 115 may be coupled directly to shaft 110. While the exemplary embodiment is directed towards a gas turbine engine, the systems and methods described herein are not limited to any one particular engine or machine, and one of ordinary skill in the art will appreciate that the systems and methods described herein may be used in connection with other machines and/or in applications unrelated to gas turbine engines.

To monitor the operational state or health of machine 102 during operation, probes 115 are coupled to both data analyzer 120 and bearings 114. In the exemplary embodiment, probes 115 are transducers configured to measure at least one operating parameter of machine 102 including, without limitation, acceleration, velocity, displacement, displacement integrated from measured velocity, and/or velocity integrated from measured acceleration of shaft 110 as it rotates during operation of machine 102. Alternatively, probes 115 are any type of detection device that enables diagnostic system 100 to function as described herein.

In the exemplary embodiment, data analyzer 120 is coupled to, and facilitates monitoring operation of, machine 102. Data analyzer 120 is a hardware server device that collects and/or analyzes data concerning machine 102. Specifically, data analyzer 120 receives electrical signals from probes 115 and uses those signals and the configurations defined by a data analyzer configuration tool 132 on client computing device 130 to monitor and diagnose the operation of machine 102. In at least some embodiments, data analyzer 120 is an Automated Diagnostics for Rotating Equipment (ADRE) device manufactured by Bently Nevada and data analyzer configuration tool 132 is at least a portion of ADRE Sxp software, also developed by Bently Nevada. Alternatively, data analyzer 120 may be any data analyzer that enables diagnostic system 100 to function as described herein.

In the exemplary embodiment, data analyzer configuration tool 132 is an interactive drag and drop graphical user interface tool stored within computing device 130 that facilitates defining a configuration of data analyzer 120, and generating a machine train diagram (not shown in FIG. 1) of machine 102. Each configuration of data analyzer 120 and machine 102 generated by data analyzer configuration tool 132 is stored as an independent database on data analyzer 120 for use in diagnostic system 100. As described in further detail below, data analyzer configuration tool 132 provides a simple environment in which users of all experience levels can quickly generate a configuration of data analyzer 120 and generate a machine train diagram (MTD) representing machine 102 that may be saved as a configuration database on data analyzer 120 and used by diagnostic system 100.

Data analyzer configuration tool 132 further includes a probe configuration tool (not shown in FIG. 1) that displays a number of probes 115 coupled to bearing 114, a machine operating parameter measured by probe 115, an orientation of probe 115 with respect to shaft 110, and a sensitivity level of probe 115. The probe configuration tool enables a user (not shown in FIG. 1) to modify each of the machine operating parameter to be measured by probe 115, the orientation of probe 115, and the sensitivity level of probe 115 within the probe configuration tool. In the exemplary embodiment, computing device 130 coupled to data analyzer 120 facilitates aiding a user in generating a configuration database, as described in detail below. In the exemplary embodiment, computing device 130 is a separate component from data analyzer 120. Alternatively, computing device 130 and data analyzer 120 may both be implemented in the same hardware device.

Figure 2:
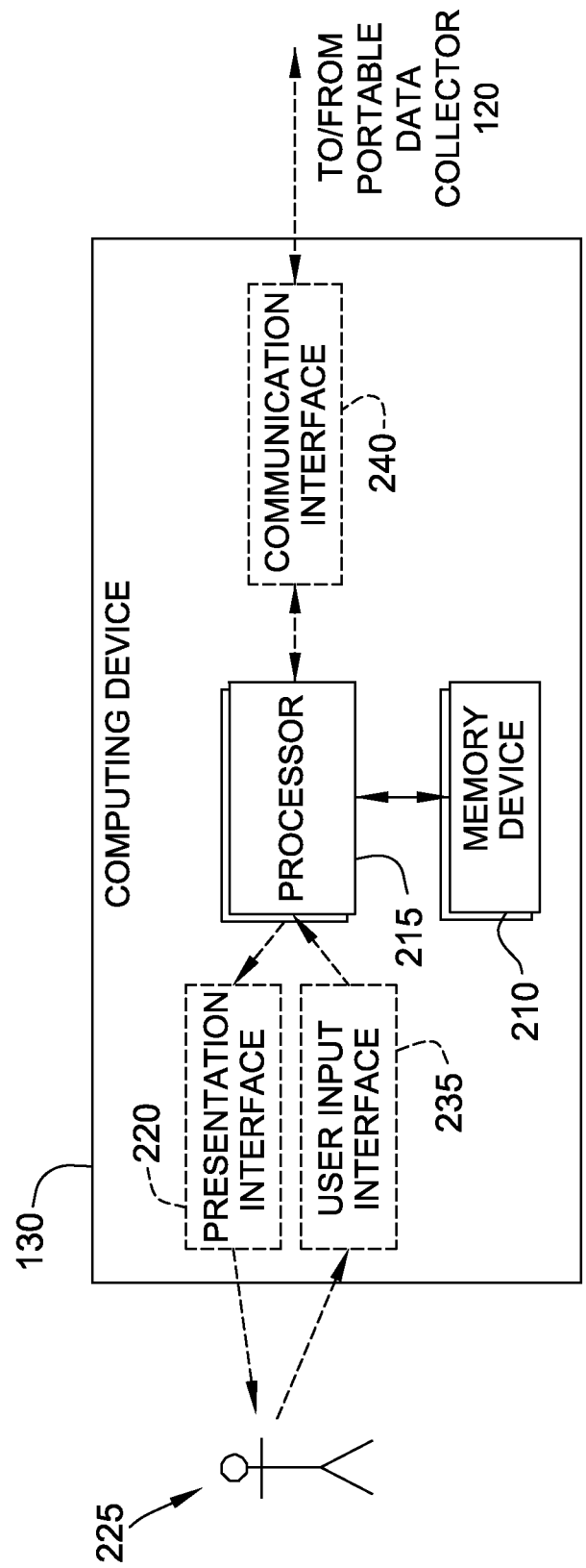
FIG. 2 is a block diagram of an exemplary computing device that may be used with the system shown in FIG. 1.

FIG. 2 is a block diagram of computing device 130 (shown in FIG. 1). Computing device 130 includes at least one memory device 210 and a processor 215 that is coupled to memory device 210 for executing instructions. In some embodiments, executable instructions are stored in memory device 210. In the exemplary embodiment, computing device 130 performs one or more operations described herein by programming processor 215. For example, processor 215 may be programmed by encoding an operation as one or more executable instructions and by providing the executable instructions in memory device 210.

Processor 215 may include one or more processing units (e.g., in a multi-core configuration). Further, processor 215 may be implemented using one or more heterogeneous processor systems in which a main processor is present with secondary processors on a single chip. As another illustrative example, processor 215 may be a symmetric multiprocessor system containing multiple processors of the same type. Further, processor 215 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, memory device 210 is one or more devices that enable information such as executable instructions and/or other data to be stored and retrieved. Memory device 210 may include one or more computer readable media, such as, without limitation, dynamic random access memory (DRAM), static random access memory (SRAM), a solid state disk, and/or a hard disk. Memory device 210 may be configured to store, without limitation, application source code, application object code, source code portions of interest, object code portions of interest, configuration data, execution events and/or any other type of data.

In some embodiments, computing device 130 includes a presentation interface 220 that is coupled to processor 215. Presentation interface 220 presents information, such as application source code and/or execution events, to a user or operator 225. For example, presentation interface 220 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 220 includes one or more display devices.

In the exemplary embodiment, computing device 130 includes a user input interface 235. In the exemplary embodiment, user input interface 235 is coupled to processor 215 and receives input from user 225. User input interface 235 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 220 and user input interface 235. Computing device 130 may include, among other possibilities, a web browser and/or a client application. Web browsers and client applications enable users, such as user 225, to display and interact with media and other information from computing device 130 and/or other control systems, such as data analyzer 120 (shown in FIG. 1).

In some embodiments, computing device 130 includes a communication interface 240 coupled to processor 215. Communication interface 240 communicates with one or more remote devices, such as data analyzer 120 over a network (not shown), such as, without limitation, the Internet, a local area network (LAN), a wide area network (WAN), a wireless LAN (WLAN), and/or a virtual private network (VPN). To communicate with remote devices, communication interface 240 may include, for example, a wired network adapter, a wireless network adapter, and/or a mobile telecommunications adapter. In the exemplary embodiment processor 215 facilitates configuring data analyzer 120 using data analyzer configuration tool 132 (shown in FIG. 1) based on input from user 225. Processor 215 further facilitates defining a probe 115 configuration using data analyzer configuration tool 132, and more specifically, the probe configuration tool (not shown in FIG. 2), based on input from user 225. In the exemplary embodiment, data analyzer configuration tool 132 is a computer program stored on a computer readable medium (such as memory device 210) and executed by processor 215.

Figure 3:
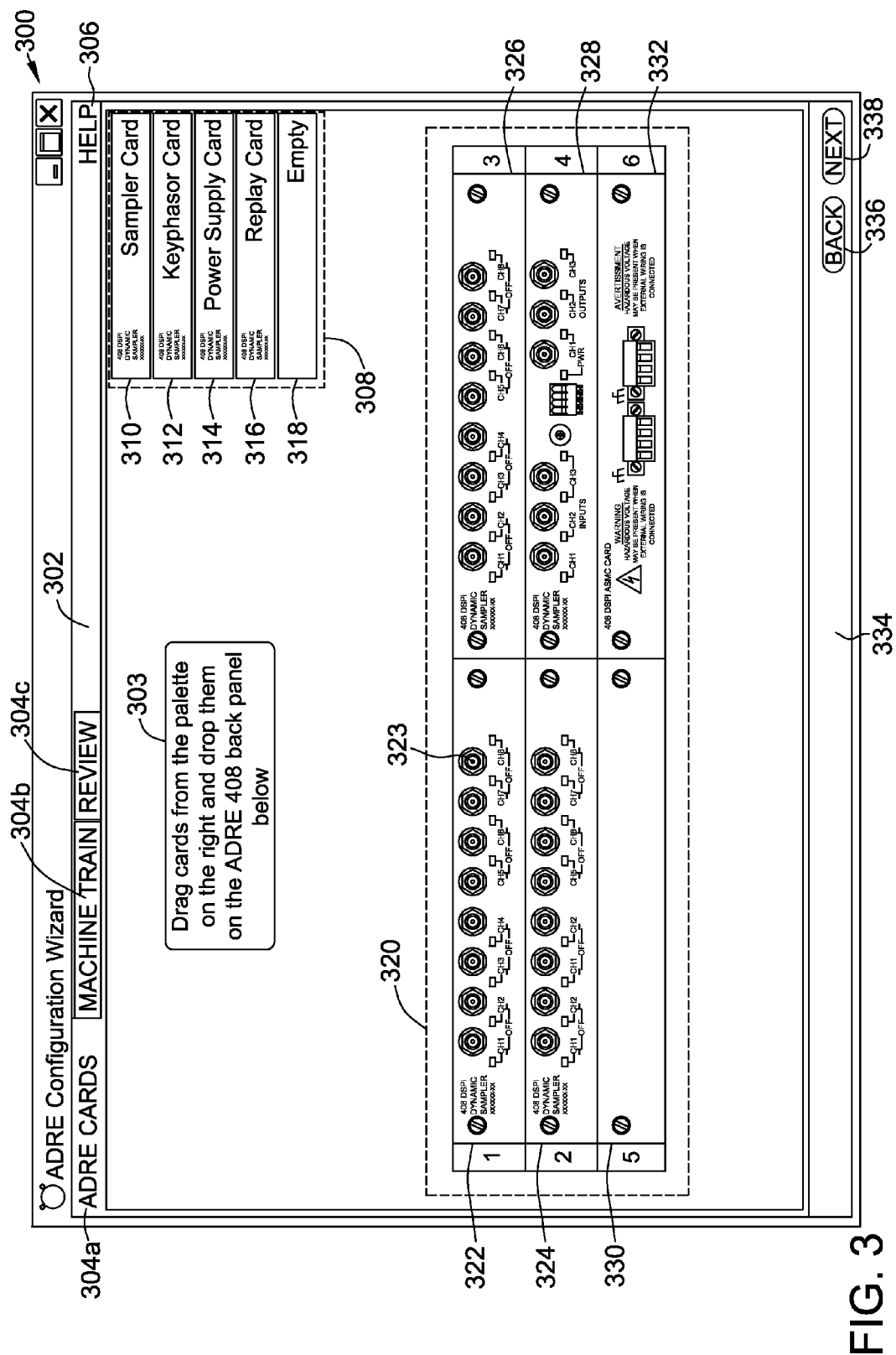
FIG. 3 is an exemplary first screenshot of a data analyzer configuration tool that may be used with the system shown in FIG. 1.

FIGS. 3-6 are images of user interface screens, or screenshots, of a typical embodiment of data analyzer configuration tool 132 (shown in FIG. 1) for configuring data analyzer 120 (shown in FIG. 1). The screens are displayed to user 225 (shown in FIG. 2) on presentation interface 220 (shown in FIG. 2) and require action by user 225 on user input interface 235 (shown in FIG. 2) to operate data analyzer configuration tool 132. FIG. 3 is an exemplary first screenshot 300 that may be displayed to user 225 on presentation interface 220 of computing device 130. In the exemplary embodiment, screenshot 300 is displayed to user as part of data analyzer configuration tool 132.

Screenshot 300 displays a plurality of navigation tabs 304a, 304b, and 304c in a first navigation bar 302 to assist user 225 in navigating within data analyzer configuration tool 132. First navigation bar 302 also includes a help button 306 that user 225 may select using user input interface 235 to display a help menu (not shown). A second navigation bar 334, at the bottom of screenshot 300, displays errors or warning messages to user 225 to indicate a configuration error within data analyzer configuration tool 132. Second navigation bar 334 also includes navigation buttons 336 and 338 to facilitate navigation between a previous display screen or a subsequent display screen of data analyzer configuration. Navigation buttons 336 and 338 may be used independent from or in combination with tabs 304a, 304b, and 304c to assist user 225 in navigating within data analyzer configuration tool 132.

In the exemplary embodiment, screenshot 300 of data analyzer configuration tool 132 also displays an instruction box 303 containing instructions to user 225 illustrating how to generate a data analyzer configuration 320. Screenshot 300 displays configuration 320 including at least a portion of data analyzer 120 having a plurality of slots. In the exemplary embodiment, configuration 320 includes six slots 322, 324, 326, 328, 330, and 332. Screenshot 300 also includes a palette 308 of selectable graphical representations of data analyzer 120 components. In the exemplary embodiment, data analyzer 120 components are hardware cards 310, 312, 314, 316, and 318. Card 310 is a dynamic sampling card adapted for signal processing and containing a plurality of inputs 323 for coupling probes 115 (shown in FIG. 1) with data analyzer 120 and may be installed in any of slots 322, 324, 326, and/or 328.

Card 312 is a Keyphasor® card ("Keyphasor" is a registered trademark of Bently Nevada, Inc. of Nevada, United States of America) also containing a plurality of inputs 323 for coupling probes 115 (shown in FIG. 1) with data analyzer 120. Card 312 may be installed in any of slots 322, 324, 326, and/or 328, however data analyzer 120 supports only two Keyphasor® cards 312 per configuration 320. Card 312 is a three-channel input card that supports a variety of transducer inputs 323 and signal conditioning needs including; proximity, magnetic, optical, and laser pickups.

Card 314 is a transducer power supply card that provides power to displacement, velocity, acceleration, force hammers, and other probe 115 types used in diagnostic system 100 (shown in FIG. 1). Card 314 is configured to simultaneously power up to thirty-two probes 115 in various combinations, and provides direct physical connections for up to sixteen probes 115. Card 314 may be installed in any of slots 322, 324, 326, 328, and also slot 330 so as not to reduce the amount of slots available for sampling cards 310 or Keyphasor® cards 312.

Card 316 is a digital replay card that provides simultaneous synchronous and asynchronous internal digital reprocessing and playback of all input 323 channels in data analyzer 120. Card 316 is configured to play back raw data for all input 323 channels simultaneously including Keyphasor® card 312 and dynamic sampler card 310. In the exemplary embodiment, digital replay card 316 may be installed only in slot 330 such that the number of slots available for data collection is not reduced. Card 318 represents an empty card that user 225 may use to represent an unused slot in data analyzer 120 hardware device or to remove card 310, 312, 314, or 316 from slot 322, 324, 326, 328, or 330. Slot 332 of configuration 320 contains a system management card that is fixed in slot 332.

In the exemplary embodiment, user 225 selects one of the graphical representations of data analyzer 120 components, card 310, 312, 314, 316, or 318, from palette 308 and transfers it to one of slots 322, 324, 326, 328, or 330. User 225 then repeats the transfer as desired to generate configuration 320 such that configuration 320 represents data analyzer 120 hardware device operated by user 225. In the exemplary embodiment, user 225 transfers (drags) the graphical representation of data analyzer 120 component by utilizing user input interface 235, such as, for example, but not limited to, a pointing device or a touch sensitive panel (e.g., a touch pad or a touch screen). User 225 selects data analyzer 120 component by pressing a button on pointing device 235, utilizes pointing device 235 to move the selected data analyzer 120 component from palette 308 to one of slots 322, 324, 326, 328, or 330 on configuration 320, and releases the button to complete the transfer or dragging process. For example, user 225 may select card 310 from palette 308 and transfer it to slot 322. User may then again select card 310 from palette 308 and transfer it to slot 324, and again select card 310 from palette 308 and transfer it to slot 326. User may then select card 312 from palette and transfer is to slot 326, and select card 318 to transfer to slot 330 to generate configuration 320.

In the exemplary embodiment, once card 310, 312, 314, 316, or 318 has been transferred to one of slots 322, 324, 326, 328, or 330 from palette 308, hovering pointing device 235 on top of card 310, 312, 314, 316, or 318 on image 320 displays card 310, 312, 314, 316, or 318 type and also displays an "x", which user 225 may select to remove card 310, 312, 314, 316, or 318 from slot 322, 324, 326, 328, or 330. Upon selection of the "x", data analyzer configuration tool 132 replaces removed card 310, 312, 314, 316, or 318 with empty card 318. Screenshot 300 displays generated configuration 320 based on data analyzer 120 components, cards 310, 312, 314, 316, or 318, selected and transferred from palette 308 by user 225.

Figure 4:
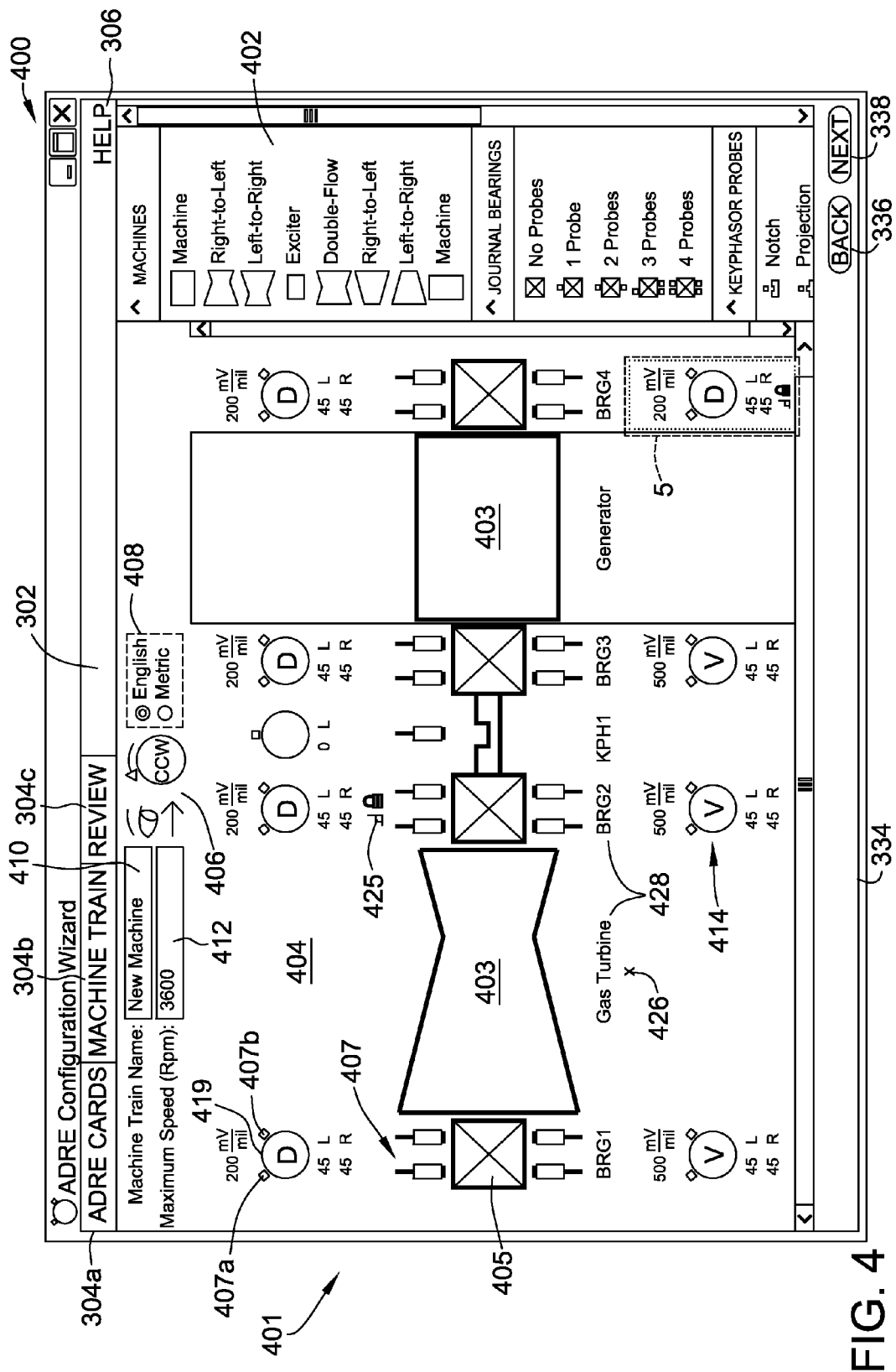
FIG. 4 is an exemplary second screenshot of a data analyzer configuration tool that may be used with the system shown in FIG. 1.

FIG. 4 is a second exemplary screenshot 400 that may be displayed to user 225 (shown in FIG. 2) on presentation interface 220 of computing device 130 (shown in FIG. 1). In the exemplary embodiment, screenshot 400 is displayed to user 225 as a portion of data analyzer configuration tool 132. Some elements of screenshot 400 are substantially similar to screenshot 300 (shown in FIG. 3), as such, components shown in FIG. 4 are labeled with the same reference numbers used in FIG. 3. In the exemplary embodiment, data analyzer configuration tool 132 initially displays a partially blank interactive workspace 404 on which user 225 generates an interactive machine train diagram (MTD) 401 of machine 102 (shown in FIG. 1), to be diagnosed by diagnostic system 100.

At the top of interactive workspace 404, proximate to tabs 304a, 304b, and 304c, is a machine train name editor 410 and a machine speed editor 412. Machine train name editor 410 enables user 225 to identify MTD 401 with a customized label directly on interactive workspace 404. Machine train speed editor 412 displays, and enables user 225 to modify, the operating speed of machine 102 in revolutions per minute. Screenshot 400 also displays a rotation direction indicator 406 to illustrate the direction of rotation of shaft 110 (shown in FIG. 1) with respect to the viewpoint of user 225. Proximate to rotation direction indicator 406 is a unit indicator display 408 that illustrates to user 225 the measurement system used in diagnostic system 100. Unit indicator display 408 is selectable for use between English units and Metric units.

In the exemplary embodiment, data analyzer configuration tool 132 also displays on screenshot 400 a palette 402 of selectable graphical representations of MTD 401 components. In the exemplary embodiment, MTD 401 components include, without limitation: graphical representations of machines 403 to represent machine 102 components including a turbine, a compressor, a motor, and a generator; graphical representations of bearings 405 to represent bearings 114 including journal bearings, rolling bearings, axial bearings, and couplings; and graphical representations of probes 407 to represent probes 115 including Keyphasor® probes and shaft probes. Each bearing 405 includes at least one probe 407 coupled to bearing 405. Alternatively, bearing 405 may be illustrated without probe 407. Additionally, probe 407 may be coupled directly to shaft 110 and not coupled to bearing 405. When user 225 hovers pointing device 235 on top of machine 403, bearing 405, or probe 407, data analyzer configuration tool 132 displays a description of machine 403, bearing 405, or probe 407 including machine 403, bearing 405, or probe 407 type and with how many probes 407 bearing 405 is instrumented.

In the exemplary embodiment, user 225 selects one of the graphical representations of MTD 401 components, a machine 403, a bearing 405, or a probe 407, from palette 402 and transfers the component to interactive workspace 404. User 225 then repeats the transfer using the desired machines 403, bearings 405, and/or probes 407 to generate MTD 401, such that MTD 401 represents machine 102 to be diagnosed by diagnostic system 100. In the exemplary embodiment, user 225 transfers (drags) machine 403, bearing 405, or probe 407 from palette 402 by utilizing pointing device 235. User 225 selects machine 403, bearing 405, or probe 407 by pressing a button on pointing device 235, utilizes pointing device 235 to move selected machine 403, bearing 405, or probe 407 from palette 402 to interactive workspace 404, and releases the button to complete the transfer or dragging process. Data analyzer configuration tool 132 automatically (without input from user 225) displays selected MTD 401 components horizontally across interactive workspace 404. For example, user may select bearing 405 that includes four probes 407 from palette 402 and transfer bearing 405 as described above to interactive workspace 404. User 225 may then select machine 403 from palette 402 and transfer machine 403 to interactive workspace 404. User 225 continues in such a manner until generated MTD 401 represents machine 102 to be diagnosed.

Once the desired MTD 401 components are transferred to interactive workspace 404, user 225 may modify the displayed order of MTD 401 components by selecting desired machine 403, bearing 405, or probe 407 and dragging it to an alternative position on MTD 401 within interactive workspace 404. When user 225 hovers pointing device 235 on top of machines 403, bearings 405, or probes 407 on MTD 401, data analyzer configuration tool 132 displays a description of machine 403, bearing 405, or probe 407 including machine 403, bearing 405, or probe 407 type and with how many probes 407 bearing 405 is instrumented. In addition to the description, data analyzer configuration tool 132 displays a removal button 426, such as an "x", which user 225 may select to remove machine 403, bearing 405, or probe 407 from MTD 401. Data analyzer configuration tool 132 also displays a default MTD 401 component label in a component label editor 428 for each machine 403, bearing 405, and probe 407. Component label editor 428 enables user 225 to modify the default MTD 401 component label to identify machine 403, bearing 405, and probe 407 with a customized label directly on interactive workspace 404.

In the exemplary embodiment, when bearing 405 is instrumented with at least one probe 407, or probe 407 is not coupled to bearing 405, then data analyzer configuration tool 132 displays an interactive probe configuration tool 414 (shown as reference box 5 on FIG. 4) on interactive workspace 404 above and/or below MTD 401 based on the number of probes 407 coupled to bearing 405. Probe configuration tool 414 is configured to facilitate defining a probe configuration. When bearing 405 contains one or two probes 407, then probe configuration tool 414 is displayed above bearing 405. However, if bearing 405 contains three or four probes, then data analyzer configuration tool 132 displays a probe configuration tool 414 above and below bearing 405. For example, user 225 selects journal bearing 405 including four probes 407 and transfers it to interactive workspace 404. Data analyzer configuration tool 132 then displays a first probe configuration tool 414 above journal bearing 405 and a second probe configuration tool 414 below journal bearing 405.

Figure 5:
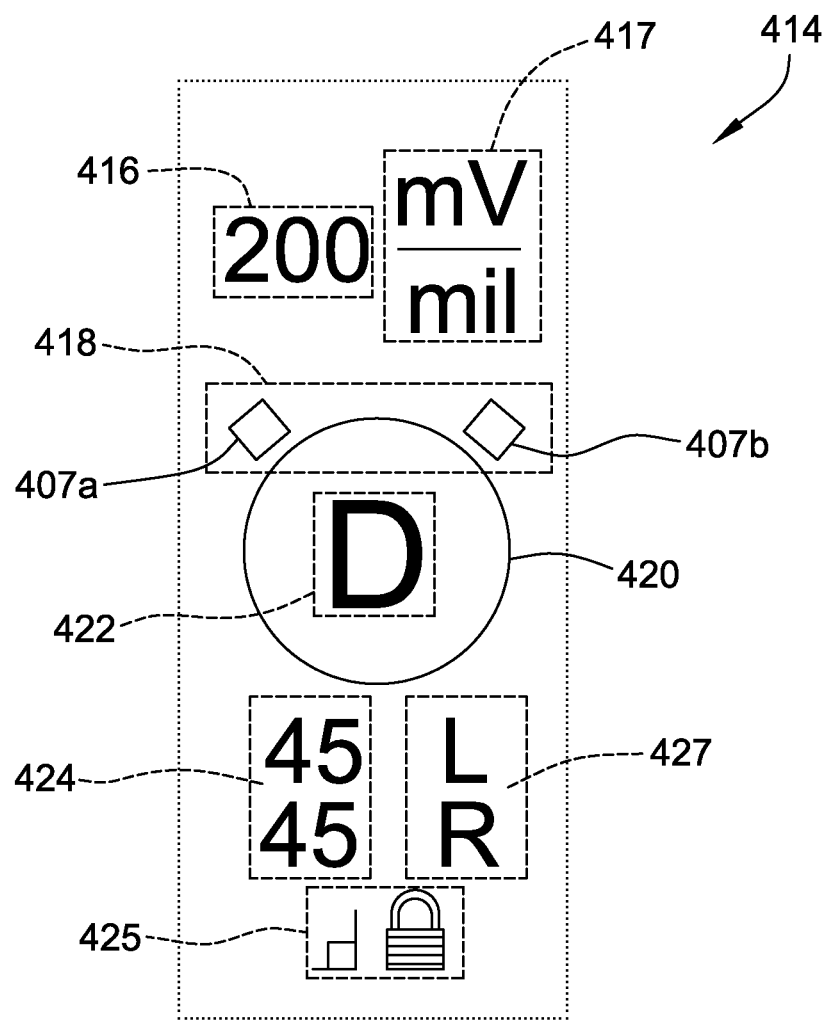
FIG. 5 is an enlarged view of a portion of the second screenshot of a data analyzer configuration tool shown in FIG. 4.

FIG. 5 is an enlarged view of a portion of screenshot 400 (shown in FIG. 4) of data analyzer configuration tool 132. Specifically, FIG. 5 illustrates probe configuration tool 414, displayed on presentation interface 220 to user 225 as a portion of data analyzer configuration tool 132. In the exemplary embodiment, interactive probe configuration tool 414 is configured to simultaneously display on presentation interface 220: a shaft icon 420 representative of shaft 110 (shown in FIG. 1); at least one probe icon 407a representative of probe 115 (shown in FIG. 1) displayed relative to a circumference of shaft icon 420; an orientation of probe icon 407a relative to shaft icon 420; a scale factor display 416; a sensitivity unit display 417; a probe position indicator 418; a probe type indicator 422; a probe position editor 424; a probe position lock indicator 425; and a direction editor 427. In the exemplary embodiment, probe configuration tool 414 simultaneously displays an orientation of probe icon 407a and an orientation of a second probe icon 407b. Probe configuration tool 414 is described below as including probe icon pair 407a and 407b, but it will be understood by one having skill in the art that probe configuration tool 414 may include a single probe icon 407a, or more than two probe icons 407a and 407b.

Scale factor display 416 displays a default sensitivity level for probe icon pair 407a and 407b. Each probe icon 407a and 407b represents a probe 115 type that includes a default sensitivity level that is modifiable according to user 225 input. User 225 may edit the displayed default sensitivity level of probe icons 407a and 407b by utilizing pointing device 235 to select and edit the default sensitivity level within probe configuration tool 414 on interactive workspace 404. Probe configuration tool 414 also includes a unit display 417 adjacent to scale factor display 416. Unit display 417 illustrates the units of measurement that define the sensitivity level illustrated by scale factor display 416.

Probe type indicator 422 is configured to display a default type of probe 115 represented by probe icons 407a and 407b coupled to bearing 405 The displayed probe icon 407a and 407b type indicates to user which shaft 110 operating parameter probes 115 are measuring. When probes 115 are measuring the displacement of shaft 110 as it rotates, a "D" is displayed in probe type indicator 422. When probes 115 are measuring the velocity of shaft 110 as it rotates, a "V" is displayed in probe type indicator. When probes 115 are measuring the acceleration of shaft 110 as it rotates, an "A" is displayed in probe type indicator. When probes 115 are measuring the displacement as integrated from the measured velocity of shaft 110 as it rotates, a "Di" is displayed in probe type indicator. When probes 115 are measuring the velocity as integrated from the measured acceleration of shaft 110 as it rotates, a "Vi" is displayed in probe type indicator.

In the exemplary embodiment, user 225 may selectively change the default probe icon 407a and 407b type displayed on probe configuration tool 414 by selecting, or clicking, probe type indicator 422 with pointing device 235. Repeatedly selecting probe type indicator 422 toggles through available probe icon 407a and 407b types such that probe icon 407a and 407b type is selected based on the number of times user 225 selects probe type indicator 422. Each selection of pointing device 235 not only changes the displayed probe icon 407a and 407b type, but also changes scale factor display 416 and unit display 417 to the default sensitivity level and units of probe icon 407a and 407b type displayed in probe type indicator 422. In the exemplary embodiment, probe type indicator 422 displays probe icon 407a and 407b type and facilitates determining the type of probe icon 407a and 407b coupled to bearing 405 on interactive workspace 404.

In the exemplary embodiment, probe configuration tool 414 graphically displays the orientation of probe icons 407a and 407b relative to shaft icon 420 using probe position indicator 418. Further, probe configuration tool 414 algebraically displays the orientation of probe icons 407a and 407b with probe position editor 424. Probe position indicator 418 graphically illustrates the orientation of probe icons 407a and 407b by displaying them with respect to shaft icon 420. Probe position editor 424 algebraically illustrates the orientation of probe icons 407a and 407b by displaying an angular value and direction from a reference point 419, the top of shaft icon 420, at which probe icons 407a and 407b are positioned. As used herein, the term "algebraically" is used to denote an orientation of probe icons 407a and/or 407b defined by an angular value and a direction of the angular value with respect to reference point 419.

In the exemplary embodiment, when bearing 405, instrumented with at least one probe icon pair 407a and 407b, is transferred from palette 402 to interactive workspace 404, probe configuration tool 414 displays probe icon 407a at a default location 45 degrees left of reference point 419 and displays probe icon 407b at a default location 45 degrees right of reference point 419. The angular value, for example 45 degrees, of the orientation of probe icons 407a and 407b is illustrated by probe position editor 424, and the direction, for example "L" or "R", of the angular value of probe icon 407a and 407b orientation is indicated by direction editor 427. In the exemplary embodiment, user 225 may change the orientation of probe icons 407a and/or 407b by selecting probe icon 407a or 407b with pointing device 235 in probe position indicator 418 and dragging it relative to a circumference of shaft icon 420.

Probe position editor 424 and direction editor 427 are synchronized with probe position indicator 418 such that probe position editor 424 and direction editor 427 simultaneously display the changing angular value and direction with respect to reference point 419 of probe icons 407a and 407b as the orientation of probe icons 407a and 407b, as displayed by probe position indicator 418, changes based on the actions of user 225. Alternatively, user 225 may modify the angular value displayed by probe position editor 424 by selecting, with pointing device 235, the angular value and entering a second, different, angular value using a second user input interface 235, such as a keyboard. Additionally, user 225 may modify the orientation direction with respect to reference point 419 displayed by direction editor 427 by selecting, with pointing device 235, the displayed "L" or "R", which results in changing the orientation of the selected probe icon 407a or 407b between an angular value left of reference point 419 and the same angular value right of reference point 419. Alternatively, user 225 may input an alphanumeric of the angular value and desired "L" or "R" using second user input interface 235, such as a keyboard. Probe position indicator 418, probe position editor 424, and direction editor 427 illustrate a location of probes 115 with respect to shaft 110 on machine 102 being diagnosed and facilitate customizing the location of probe icons 407a and 407b relative to shaft icon 420.

In the exemplary embodiment, probe configuration tool 414 further includes a probe position lock indicator 425. Probe position lock indicator 425 is displayed on probe configuration tool 414 when user 225 hovers pointing device 235 above any part of probe configuration tool 414. Probe position lock indicator 425, when activated, is configured to facilitate synchronizing probe icons 407a and 407b at a pre-determined angular value from each other such that when user 225 selects and drags one of probe icon 407a or 407b relative to the circumference of shaft icon 420 to change the orientation of probe icon 407a or 407b, the unselected probe icon 407a or 407b travels correspondingly. In the exemplary embodiment, the pre-determined angular value is 90 degrees, which allows probes 115 to measure machine 102 operating parameter from orthogonal directions. Alternatively, the pre-determined angular value may be any angular value that enables data analyzer configuration tool 132 to operate as described herein. User 225 may selectively activate probe position lock indicator 425 on or off by selecting indicator 425 with pointing device 235. When probe position lock indicator 425 is deactivated, user 225 may position each probe icon 407a and 407b as desired independently of each other. When probe position lock indicator 425 is activated, modifying the position of selected probe icon 407a or 407b, utilizing either probe position indicator 418, probe position editor 424, or direction editor 427 results in correspondingly changing the position of unselected probe icon 407a or 407b.

Figure 6:
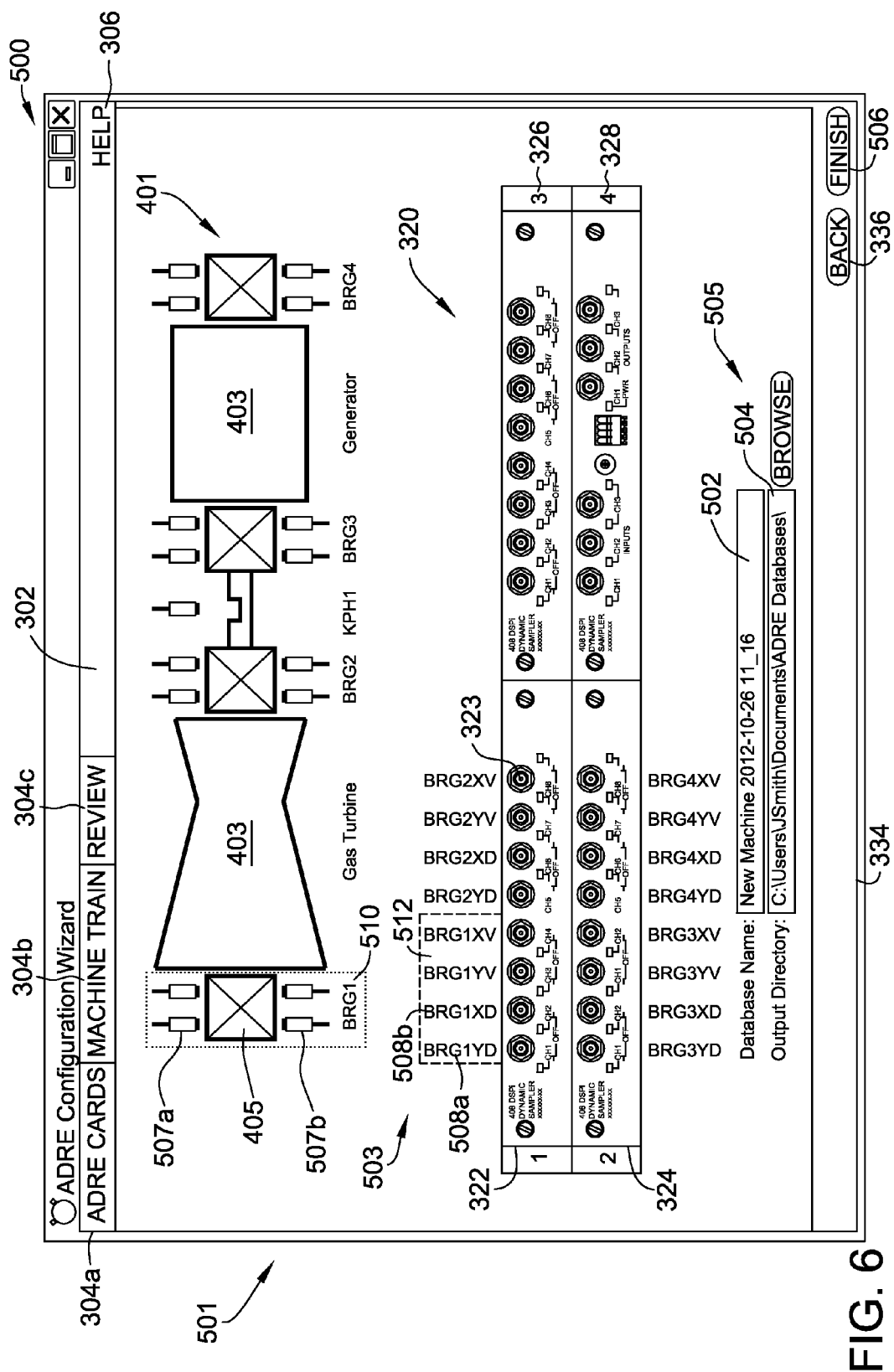
FIG. 6 is an exemplary third screenshot of a data analyzer configuration tool that may be used with the system shown in FIG. 1.

FIG. 6 is an exemplary screenshot 500 of a review display 501 that may be displayed to user 225 (shown in FIG. 2) on presentation interface 220 (shown in FIG. 2) of computing device 130. In the exemplary embodiment, screenshot 500 is displayed to user 225 as a portion of data analyzer configuration tool 132. Some elements of screenshot 500 are substantially similar to screenshot 300 (shown in FIG. 3) and screenshot 400 (shown in FIG. 4), as such, components shown in FIG. 6 are labeled with the same reference numbers used in FIGS. 3 and 4. In the exemplary embodiment, data analyzer configuration tool 132 simultaneously displays, on review display 501, generated MTD 401 and at least a portion of data analyzer configuration 320. More specifically, review display 501 illustrates a connection configuration 503 depicting a probe 507a and a second probe 507b and their corresponding input 323 assignments on configuration 320 as determined by data analyzer configuration tool 132 based on probe 507a and 507b location in MTD 401.

Data analyzer configuration tool 132 displays, at the top of review display 501, a non-interactive graphical representation of MTD 401, including machine 403, bearing 405, and/or probe 407 labels, as generated by user 225 using component label editor 428 (shown in FIG. 4) of data analyzer configuration tool 132 as described above. Data analyzer configuration tool 132 simultaneously displays, on review display 501 beneath MTD 401, at least a portion of data analyzer configuration 320 as generated by user 225 using data analyzer configuration tool 132 as described above. For example, review display 501 illustrates slots 322, 324, 326, and 328 containing cards 310, 310, 310, and 312, respectively. Alternatively, review display 501 may illustrate any configuration 320 of data analyzer 120 as generated by user 225. Furthermore, review display 501 includes a probe label editor 512, a configuration name editor 502 and a file destination editor 504. Configuration name editor 502 enables user 225 to identify connection configuration 503 with a customized label directly on review display 501. File destination editor 504 enables user 225 to determine the destination of a configuration file 505 generated by data analyzer configuration tool 132.

In the exemplary embodiment, review display 501 illustrates a portion 510 of MTD 401, wherein portion 510 includes bearing 405 and at least probes 507a and 507b. Data analyzer configuration tool 132 displays a probe label 508a and 508b for each probe 507a and 507b, respectively, on data analyzer configuration 320 indicating corresponding input 323 assignments as determined by data analyzer configuration tool 132 based on probe 507a and 507b location in MTD 401. Input 323 assignments are designated such that the first probes, probes 507a and 507b of portion 510, are assigned to the first inputs 323 of the corresponding card, card 310 for acceleration, velocity, or displacement probes or card 312 for Keyphasor® probes. Assignments are determined as such until each probe 507a and 507b of MTD 401 is assigned an input 323 on connection configuration 503. When input 323 assignments have been made, probe label editor 512 enables user 225 to identify probes 507a and 507b with a customized label directly on review display 501.

In the exemplary embodiment, data analyzer configuration tool 132, utilizing processor 215 (shown in FIG. 2), is configured to generate configuration file 505 based on connection configuration 503 displayed on review display 501. Configuration file 505 facilitates diagnosing operation of machine 102 using data analyzer 120. Review display 501 includes a finishing button 506 that, when selected by user 225 using pointing device 235, facilitates generating configuration file 505 for use by data analyzer 120 in diagnosing machine 102 of diagnostic system 100.

Technical effects of the methods and apparatus described herein include at least one of: (a) displaying an interactive probe configuration tool to a user on an interactive workspace; (b) receiving input from the user that defines a probe configuration, wherein the defined probe configuration facilitates diagnosing operation of a machine using a data analyzer.

As compared to known configuration systems, the apparatus and methods described herein deliver enhanced data collection functionality with continuous asset management and operating condition monitoring capabilities. The apparatus and methods described herein generate probe configurations based on input received from an operator by an interactive probe configuration tool. Accordingly, unlike at least some known configuration systems that require operators to possess extensive knowledge and/or experience, the apparatus and methods described herein enable relatively inexperienced operators to successfully define a probe configuration for use in diagnostic testing. By simultaneously displaying an interactive concentration of probe configuration information in an interactive probe configuration tool, and defining a probe configuration based on operator input in a generally simple and straightforward format, the probe configuration tool significantly simplifies the process for the operator as compared to known configuration systems, thus allowing probe configurations to be defined more efficiently and accurately. Further, as compared to at least some known configuration systems that rely on detailed English-language descriptions of components, the apparatus and methods described herein provide substantially visual cues that increase efficiency and accessibility of operators around the world.

Technical effects of the methods and apparatus described herein include at least one of: (a) displaying an interactive probe configuration tool to a user on an interactive workspace; (b) receiving input from the user that defines a probe configuration, wherein the defined probe configuration facilitates diagnosing operation of a machine using a data analyzer.

The embodiments described herein define a configuration of probes coupled to a machine using a probe configuration tool in a diagnostic system. The probe configuration tool, operating on a computing device, is an interactive tool that provides a concentrated display of information required to define a probe configuration. The probe configuration tool also accepts input from a user to modify the displayed information to define a specific configuration based on the input entered by the user. A data analyzer configuration tool uses the probe configuration defined by the probe configuration tool to facilitate diagnosing operation of the machine train using the data analyzer.

Exemplary embodiments of methods and apparatus for defining a probe configuration using a probe configuration tool are described above in detail. The methods and apparatus are not limited to the specific embodiments described herein, but rather, components of apparatus and/or steps of the methods may be utilized independently and separately from other components and/or steps described herein. For example, the methods and apparatus described herein are not limited to use with diagnostic systems for gas turbine engines, but may be used with other monitoring and control systems in a number of different industrial applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A non-transitory computer readable medium comprising instructions that when executed by a processor, cause the processor to:
    execute a probe configuration tool comprising:
    a shaft icon displayed on said probe configuration tool;
    a probe position indicator configured to display an orientation of at least one first probe icon relative to said shaft icon, said probe position indicator is further configured to modify the orientation of said at least one first probe icon based on a non-typed input from a user; and
    a probe type indicator configured to display a type of said at least one first probe icon, wherein at least said probe position indicator and said probe type indicator are simultaneously displayed on a presentation interface; and
    a probe position editor configured to:
    display an angular value representative of the orientation of the at least one first probe icon with respect to a reference point on said shaft icon; and
    modify the angular value representative of the orientation based on a typed input from the user.

2. The non-transitory computer readable medium of claim 1 comprising instructions that when executed by a processor, cause the processor to:
    execute the probe configuration tool to further apply a scale factor display configured to:
    display a sensitivity level of said at least one first probe icon; and
    modify the sensitivity level of said at least one first probe icon based on input from the user, wherein said probe type indicator is further configured to selectively change the type of said at least a first probe icon based on input from the user.

3. The non-transitory computer readable medium of claim 1 comprising instructions that when executed by a processor, cause the processor to:
    execute the probe configuration tool to further apply a direction editor configured to:
    display a direction of the angular value of the orientation with respect to said reference point; and
    modify the direction of the angular value based on input from the user.

4. The non-transitory computer readable medium of claim 3, wherein said probe position editor and said direction editor are synchronized with said probe position indicator such that when the orientation of said first probe icon is modified using one of said probe position editor, direction editor, and probe position indicator, said probe configuration tool is configured to automatically modify the orientation displayed on the others of said probe position editor, direction editor, or probe position indicator correspondingly.

5. The non-transitory computer readable medium of claim 1, wherein the probe position indicator is further configured to simultaneously display the orientation of said at least one first probe icon and an orientation of a second probe icon relative to said shaft icon, wherein the orientation of said second probe icon is modifiable based on input from the user.

6. A method of defining a probe configuration, said method comprising:
    displaying to a user, on a presentation interface coupled to a processor, a shaft icon and an orientation of at least one first probe icon relative to the shaft icon;
    modifying, based on a non-typed user input, the orientation of the at least one first probe icon;
    displaying to the user a type of the at least one first probe icon, wherein the orientation and type of the at least one first probe icon are simultaneously displayed on the presentation interface;
    displaying an angular value representative of the orientation of the at least one first probe icon with respect to a reference point on the shaft icon; and
    modifying the angular value based on a typed input from the user.

7. The method of defining a probe configuration in accordance with claim 6 further comprising:
    displaying a sensitivity level of the at least one first probe icon;
    modifying the sensitivity level based on input from the user; and
    modifying the type of the at least one first probe icon based on input from the user.

8. The method of defining a probe configuration in accordance with claim 6 further comprising:
    displaying a direction of the angular value of the orientation with respect to the reference point; and
    modifying the direction based on input from the user.

9. The method of defining a probe configuration in accordance with claim 6 further comprising:
    simultaneously displaying the orientation of the at least one first probe icon and an orientation of a second probe icon relative to the shaft icon; and
    modifying the orientation of the second probe icon based on input from the user.

10. The method of defining a probe configuration in accordance with claim 9, further comprising synchronizing the first and second probe icons such that when the orientation of one of the first and second probe icons is modified, the orientation of the other of said probe icons is automatically modified.

11. A computing device comprising:
a processor configured to:
display a shaft icon representative of a shaft and a probe position indicator indicative of an orientation of a probe positioned proximate to said shaft, said probe position indicator is configured to display an orientation of at least one first probe icon, representative of said probe, relative to said shaft icon, said probe position indicator is further configured to modify the orientation of said at least one first probe icon based on a non-typed input from a user; and
a probe type indicator configured to display a type of said at least one first probe icon, wherein at least said probe position indicator and said probe type indicator are simultaneously displayed on a presentation interface;
display a scale factor display, said scale factor display is configured to:
display a sensitivity level of said at least one first probe icon; and
modify the sensitivity level based on input from the user, wherein said probe type indicator is further configured to selectively change the type of said at least a first probe icon based on input from the user;
display a probe position editor, said probe position editor is configured to:
display an angular value representative of the orientation of said at least one first probe icon with respect to a reference point on said shaft icon; and
modify the angular value representative of the orientation based on a typed input from the user.

12. The computing device in accordance with claim 11, wherein said probe position indicator is further configured to simultaneously display the orientation of said at least one first probe icon and an orientation of a second probe icon relative to said shaft icon, wherein the orientation of said second probe icon is modifiable based on input from the user.

13. The computing device in accordance with claim 12 further configured to synchronize said first and second probe icons such that when the orientation of one of said first and second probe icons is modified, the orientation of the other of said probe icons is automatically modified.

14. A non-transitory computer readable medium comprising instructions that when executed by a processor, cause the processor to:
execute a probe configuration tool comprising:
a shaft icon displayed on said probe configuration tool;
probe position indicator configured to display an orientation of at least one first probe icon relative to said shaft icon, said probe position indicator is further configured to modify the orientation of said at least one first probe icon based on input from a user; and
a probe type indicator configured to display a type of said at least one first probe icon, wherein at least said probe position indicator and said probe type indicator are simultaneously displayed on a presentation interface;
wherein said probe position indicator is further configured to simultaneously display the orientation of said at least one first probe icon and an orientation of a second probe icon relative to said shaft icon, wherein the orientation of said second probe icon is modifiable based on the input from the user;
wherein the first and second probe icons are synchronized such that when the orientation of one of said first and second probe icons is modified, the orientation of the other of said probe icons is automatically modified.

15. The non-transitory computer readable medium of claim 14, wherein the at least one first probe icon is selectively fixed at a pre-determined angular value relative to said second probe icon, and wherein said first and second probe icons are independently positionable.

16. A computing device comprising:
a processor configured to:
display a shaft icon representative of a shaft and a probe position indicator indicative of an orientation of a probe positioned proximate to said shaft, said probe position indicator is configured to display an orientation of at least one first probe icon, representative of said probe, relative to said shaft icon, said probe position indicator is further configured to modify the orientation of said at least one first probe icon based on input from a user; and
a probe type indicator configured to display a type of said at least one first probe icon, wherein at least said probe position indicator and said probe type indicator are simultaneously displayed on a presentation interface,
wherein said probe position indicator is further configured to simultaneously display the orientation of said at least one first probe icon and an orientation of a second probe icon relative to said shaft icon, wherein the orientation of said second probe icon is modifiable based on the input from the user, and
configured to synchronize said first and second probe icons such that when the orientation of one of said first and second probe icons is modified, the orientation of the other of said probe icons is automatically modified.

17. The computing device in accordance with claim 16, wherein said at least one first probe icon is selectively fixed at a pre-determined angular value relative to said second probe icon, and wherein said first and second probe icons are independently positionable.

* * * * *